United States Patent [19]

Rice

[11] 4,220,370
[45] Sep. 2, 1980

[54] TELESCOPING CAMPER

[76] Inventor: James D. Rice, 18 Tennessee La., Auburndale, Fla. 33823

[21] Appl. No.: 956,614

[22] Filed: Nov. 1, 1978

[51] Int. Cl.$^3$ .............................................. B62P 3/32
[52] U.S. Cl. ..................................... 296/165; 296/171
[58] Field of Search ............... 296/165, 171, 173, 174, 296/175, 26

[56] References Cited

U.S. PATENT DOCUMENTS

| 2,656,216 | 10/1953 | Bobroff | 296/171 |
|---|---|---|---|
| 3,363,932 | 1/1968 | Mann | 296/26 |
| 3,429,608 | 2/1969 | Farnum | 296/173 |
| 3,802,732 | 4/1974 | McKee | 296/26 |

FOREIGN PATENT DOCUMENTS

| 946022 | 4/1974 | Canada | 296/165 |
|---|---|---|---|
| 1015798 | 8/1977 | Canada | 296/173 |
| 726247 | 10/1942 | Fed. Rep. of Germany | 296/174 |
| 1405842 | 1/1969 | Fed. Rep. of Germany | 296/174 |

Primary Examiner—John J. Love
Assistant Examiner—Ross Weaver
Attorney, Agent, or Firm—Duckworth, Hobby, Allen & Pettis

[57] ABSTRACT

A telescoping camper body apparatus for pickup trucks, and the like, has a lower body portion for attachment to the truck body and a telescoping body portion telescoping over the lower body portion and having a roof thereon. Trucks are formed in the exterior portion of the lower body for guiding the telescoping upper body, while interior cylinders are formed in the lower body portion in an area formed by the exterior tracks. The interior cylinders have rods slidably mounted therein and attached to the roof of the telescoping body portion for guiding the telescoping body during raising and lowering. The cylinders preferably are hydraulic cylinders mounted therein for raising and lowering the telescoping camper body portion.

7 Claims, 5 Drawing Figures

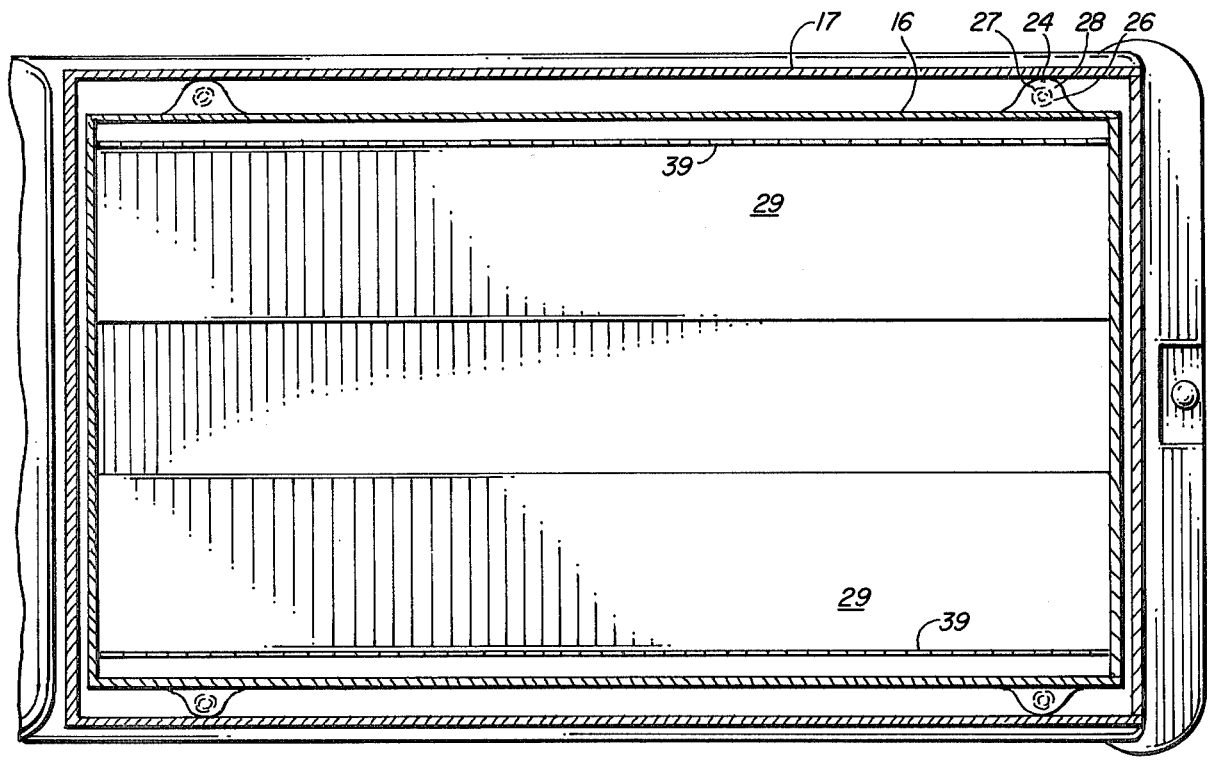
Fig. 3
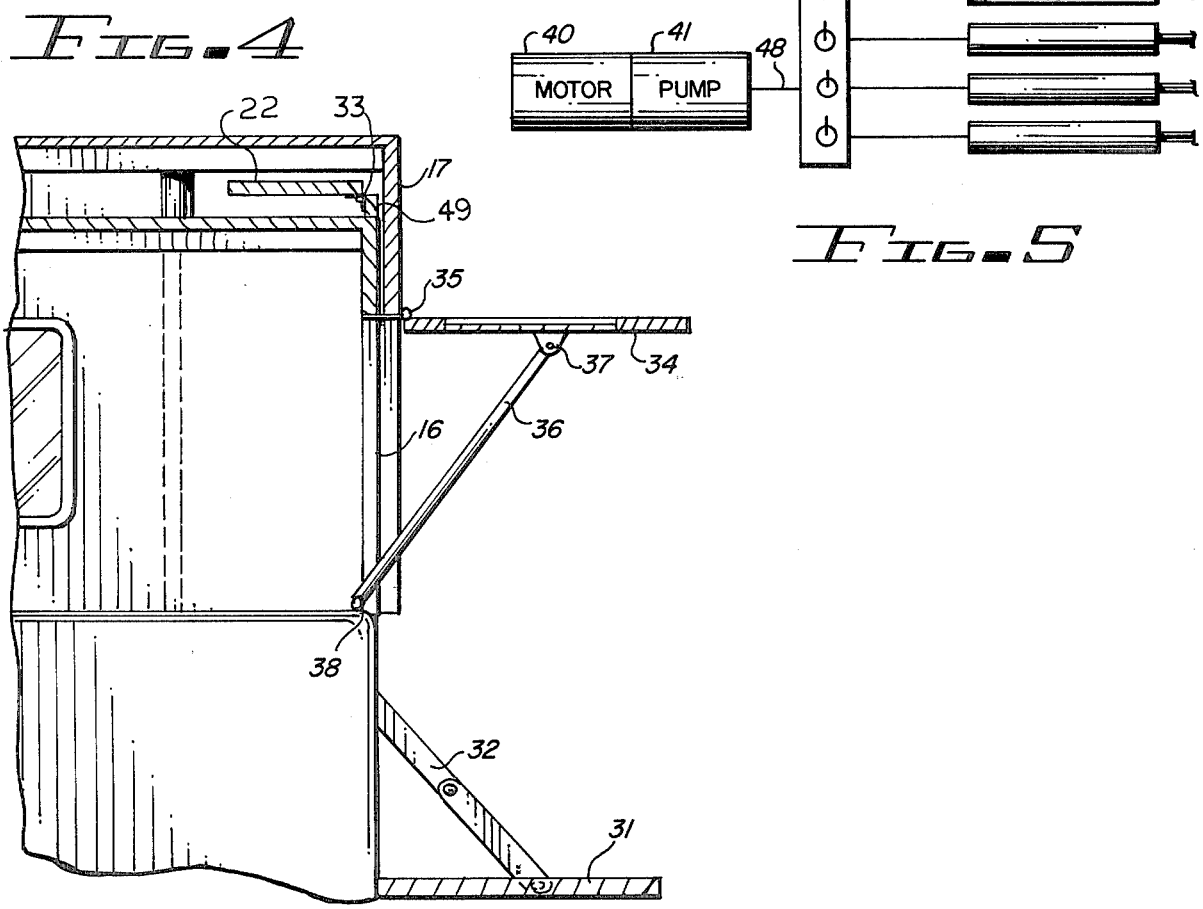
Fig. 4
Fig. 5

TELESCOPING CAMPER

BACKGROUND OF THE INVENTION

The present invention relates to camper bodies and toppers for pickup trucks, and especially to a telescoping camper body which can be lowered for travel and raised to provide additional head room when occupied.

DESCRIPTION OF THE PRIOR ART

In the past, a wide variety of camper bodies have been provided for attaching to pickup trucks, and the like, to convert the truck to a more useful vehicle for camping or carrying equipment and supplies. These camper bodies are called toppers when they consist of no more than the tops and the sides for providing a cover to the open portion of the truck bed, and typically are finished on the inside to use for camping as well as to provide storage space for carpenters and other craftsmen. One problem with camper bodies is that they are generally too low to allow for standing in the truck bed, and if made higher, give substantially increased wind resistance when driving along the road. To overcome this, a wide variety of suggestions have been made for increasing the height of camper bodies to allow for standing room in the camper when in use, but to allow the body to telescope or collapse to a shorter size for travel.

Typical prior patents can be seen in U.S. Pat. No. 4,012,070 for a convertible camper vehicle having a collapsible top portion; and in U.S. Pat. No. 3,652,119 for a telescoping camper cabin for trucks. This latter patent provides for a telescoping camper body for trucks having internal guides for guiding the raising and lowering of the telescoping portion. U.S. Pat. No. 2,893,780 provides a pickup truack telescoping cabin unit having interconnecting cables and a hand crank unit for raising and lowering the telescoping portion. U.S. Pat. No. 2,739,833 has a collapsible one and two-story house trailer, which includes tracks for guiding the telescoping portion, while U.S. Pat. No. 3,734,559 has a geared hand crank unit for raising and lowering the telescoping portion of an articulated vehicle. U.S. Pat. No. 3,650,556 has a folding screen for a telescoping travel trailer. Another U.S. Pat. is No. 3,494,655 for a trailer construction with a telescoping body having exterior tracks and a hydraulic system for driving cables for lifting or lowering the telescoping portion. U.S. Pat. No. 3,021,170 has a telescoping cover for trucks and has guides for guiding the telescoping portion during the raising and the lowering, and includes a hand crank driving a ratchet pawl mechanism and cables for lifting the telescoping portion. U.S. Pat. No. 3,506,300 is a telescoping trailer having interconnecting cables driven by a hydraulic cylinder and includes guide means for guiding the raising and lowering of the telescoping portion.

The present invention, in contrast to these prior art telescoping camper and truck bodies, advantageously utilizes exterior guides form in the lower portion of the body which provides space on the interior portion of the body for hydraulic cylinders for raising and lowering the telescoping portion. Thus, the formed-in guides serve two purposes while placing the lifting mechanism and guides adjacent each other where they cooperate to provide a smooth lifting and dropping of the telescoping portion of the camper body.

SUMMARY OF THE INVENTION

The present invention relates to a telescoping camper body for pickup trucks, and the like, which has a lower body portion adapted to be attached to a truck body and a telescoping body portion telescoping over the lower body portion and having the roof thereon. A plurality of vertically extending exterior tracks are formed in the sides of the lower body portion and protrude from the sides. A plurality of gudies are located on the telescoping body portion and ride on the lower body portion tracks. The external tracks from internal spaces for guide tubes or hydraulic cylinders mounted in the lower body portion which may have cylinder rods protruding thereabove and attached to the telescoping body portion roof for raising and lowering the telescoping body. The mounted of the lifting and lowering tubes as part of the tracks allows for a smooth lifting of the telescoping portion of the camper body. Hydraulic drive system and locking means may be provided for raising and lowering the telescoping body and locking in place, if desired.

BRIEF DESCRIPTION OF THE DRAWINGS

Other objects, features and advantages of the present invention will be apparent from the written description and the drawings, in which:

FIG. 3 is a sectional view taken on the line 3—3 of FIG. 2;

FIG. 4 is a fragmentary sectional view of the operation of the tailgate and rear end window; and FIG. 5 is a diagrammatic view of a hydraulic system for use in the present camper body.

DESCRIPTION OF THE PREFERRED EMBODIMENTS

Figure 1:
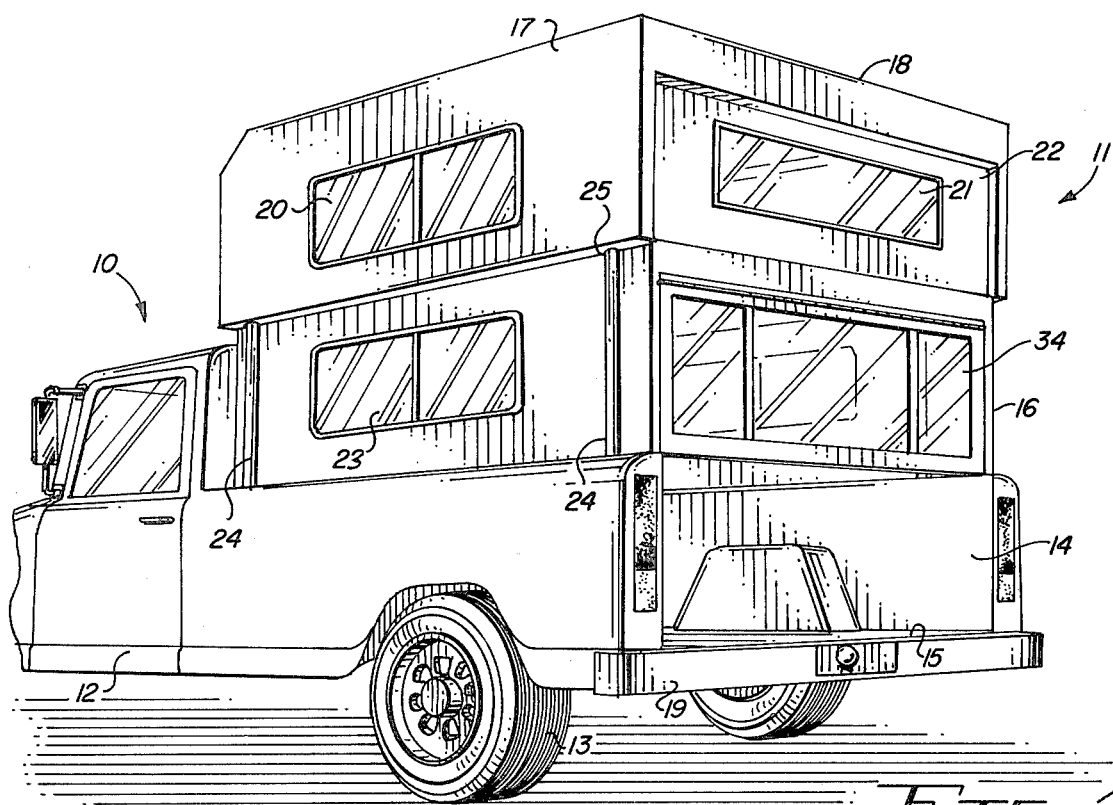
FIG. 1 is a perspective view of a pickup truck having a camper body in accordance with the present invention attached thereto.
Figure 2:
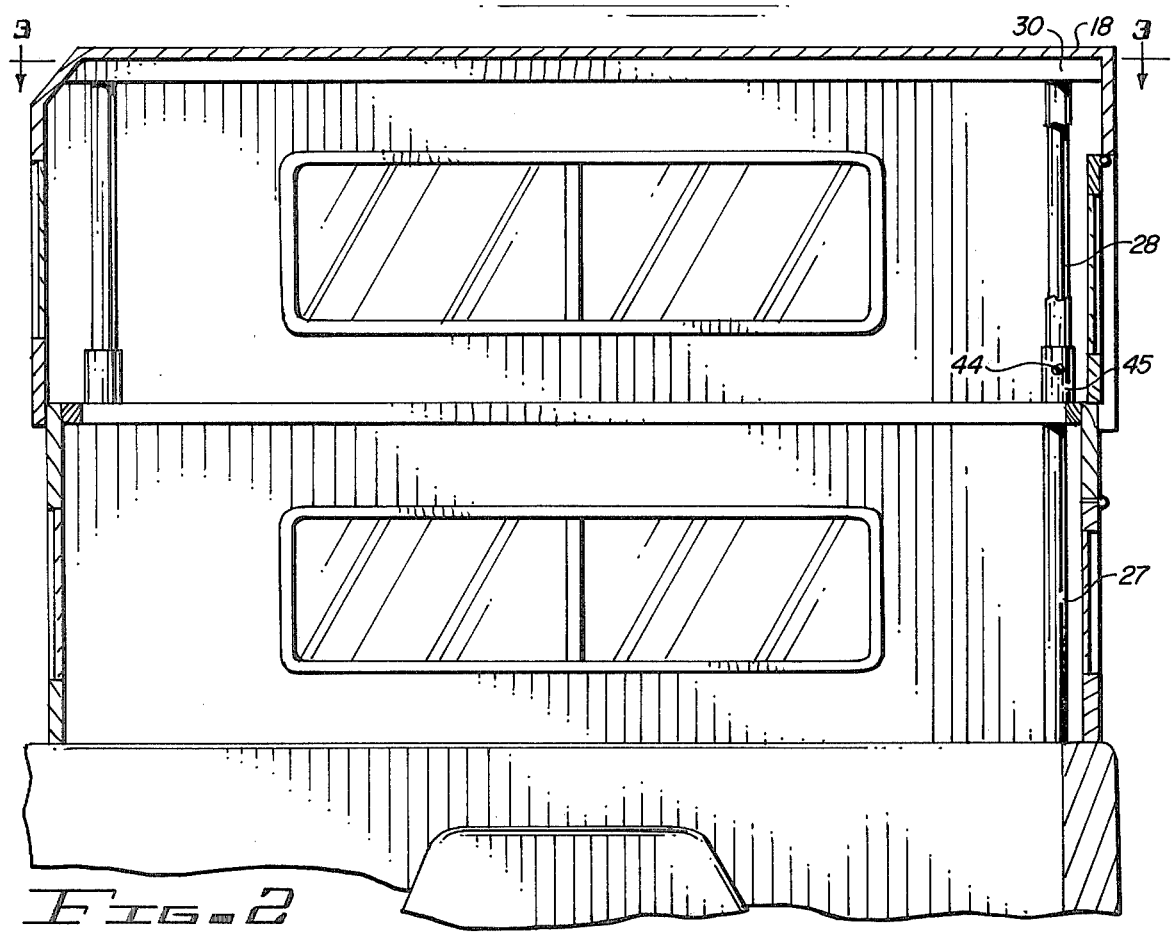
FIG. 2 is a sectional view of the camper mounting on the truck of FIG. 1.

Referring now to the drawings, and especially to FIGS. 1 and 2, a pickup truck 10 is shown having a camper body 11 mounted thereon. The pickup truck has a cab area 12, wheels 13, truck sides 14, and a truck bed 15, along with a rear bumper 19. The camper body has a lower or base portion 16 and a telescoping or upper portion 17 which has the camper roof 18 thereon. The telescoping portion 17 has side windows 20 and a rear window glass 21 mounted onto a liftable window 22. The base portion 16 has side windows 23 and a pair of tracks 24 which may be elongated in a vertical direction and may be shaped in a semi-cylindrical cross section. The truck 10 will also have a gate which has been shown removed in this view. In operation, the telescoping body portion 17 telescopes up into the position shown in FIG. 1, but slides to a lower position for travel. The telescoping portion 17 is guided by the tracks 24 and by grooves 25 formed therein riding on the tracks 24. Advantageously, the raised body 17 allows for access for beds 29 and standing room on the truck bed 15 when using the camper body 11, but lowering the body 17 to its lower position reduces wind resistance during travel, as well as keeps the body low for traveling through woods and under obstructions. The external body tracks 24 of the lower body portion 16 form a partial cylinder 26 on the inside of the body 16 where a hydraulic cylinder 27 is mounted, and which has a hydraulic cylinder rod 28 extending therefrom and attached to the roof 18 where a reinforced steel channel 30 may be mounted in the roof portion of the telescoping topper portion 17. Two cylinders 27 may be mounted on each side of the base 16 of the camper body in the grooves formed by the tracks 24, thereby getting the hydraulic cylinders out of the way of the interior of the body, but placing the cylinders and cylinder rods 28 adjacent the tracks 24 and guides 25 to provide a smooth lifting of the telescoping body portion 17 from a single drive unit, such as an electric motor driving a pump.

The sectional view of FIG. 3 illustrates the telescoping portion 17 mounted over the lower body portion 16 and having the exterior tracks 24 forming the internal space 26 for the hydraulic cylinders 27 having the cylinder rods 28 protruding therefrom. Beds 29 may be hinged to each side with hinges 39 and may be folded up when the raised body portion 17 is raised and may remain horizontal when the top portion is lowered (or raised). Thus, stand-up room is provided next to the beds 29 when in use, and the beds folded up when not in use to provide additional stand-up room.

FIG. 4 shows the truck 10 having a camper body 11 mounted thereto with the truck having a tailgate 31 supported by a drop bracket 32. In addition, it can be seen in this view that the telescoping body portion window 22 is hinged to a hinged flap 49 attached to the body portion 17, while the lower camper body portion 16 has a raisable window 34 hinged at 35 to the lower body 16 in a manner that when the telescoping body portion 17 is lowered, the window 22 folds down on hinge 33 out of the way while window 34 remains operable. A telescoping extension rod 36 is mounted to a mounting bracket 37 on the window 34 to be swung up to allow entry into the camper body when the body is raised or lowered for travel.

FIG. 5 shows a hydraulic system having an electric DC motor 40 driving a hydraulic pump 41 which directs hydraulic fluid under pressure into a manifold 42 having four individual valves 43 which can be used to individually control any of the four hydraulic cylinders 27 driving cylinder rods 28. Pump 41 is connected through line 48 to manifold 42, while manifold 42 is connected through lines 47 to cylinders 27. However, since all of the cylinders are driven simultaneously up and down, this system will work equally well without the manifold 42 and individual valves 43, except for minor adjustments that might be desired. The motor 40 and pump 41 can be placed any place desired, but typically would be located on the back portion of the truck body for easy access in raising and lowering the telescoping portion 17. In addition to the locking of the hydraulic cylinders in place with the hydraulic fluid for holding the telescoping portion 17 in a raised or lowered position, locking pins 44 can be provided as shown in FIG. 2 for locking the rods 28 extending from sleeves 45 to provide an additional safety locking feature.

It should be clear at this point that a telescoping camper body for trucks, or the like, has been provided which simplifies and provides a reliable system for raising and lowering the telescoping portion of a camper body for a truck. However, it will also be clear that variations are contemplated as being within the scope of the invention. For instance, a manual system could be provided which would allow an individual to force the camper body 17 upwards by hand, and then lock with the pins 44 and the sleeves 45 to hold the telescoping portion 17 in its raised position. Accordingly, the present invention is not to be construed as limited to the particular forms shown, which are to be considered illustrative rather than restrictive.

I claim:

1. A telescoping camper body for pickup trucks, and the like, comprising:
   a lower body portion adapted to be attached to a truck body;
   a telescoping body portion telescoping over the lower body portion and having a roof portion thereon;
   a plurality of vertically extending exterior tracks formed in the sides of said lower body portion;
   a plurality of guides on said telescoping body portion riding on said lower body portion tracks;
   internal cylinders mounted in said lower body portion vertically extending exterior tracks;
   internal rods slidably mounted in said internal cylinder and extending therefrom and attached at one end to the roof portion of said upper telescoping body portion, whereby said external tracks and guides and internal cylinders and internal rods are positioned for smoothly raising and lowering said telescoping body portion on said lower body portion of said camper body;
   a pair of cots attached to said lower body portion adjacent said roof portion of said telescoping body portion when said telescoping body portion is in a lowered position, said beds being adapted to be folded up when said telescoping body portion is raised; and
   a hinged flap attached to the rear side of said telescoping body portion and a hinged window attached to said hinged flap thereby allowing said hinged window to be folded adjacent said roof portion of said telescoping body portion and over a portion of said cots.

2. The camper body in accordance with claim 1, in which each said internal cylinder is a hydraulic cylinder and each said internal rod is a hydraulic cylinder rod attached to the roof portion of said upper telescoping body portion, whereby actuation of the hydraulic cylinders will drive the rods to lift the telescoping body portion.

3. The telescoping camper body in accordance with claim 2, in which an electric motor drives a hydraulic pump for driving each of said hydraulic cylinders mounted to said lower body portion of said telescoping camper body.

4. A telescoping camper body in accordance with claim 3, in which at least one valve is connected in a line between said hydraulic pump and said plurality of hydraulic cylinders.

5. A telescoping camper body in accordance with claim 1, in which each of said internal cylinders has a locking opening therein and each internal rod has a locking opening therein for locking each said rod to each said cylinder for holding said telescoping body portion in a raised position.

6. A telescoping camper body in accordance with claim 2, in which the roof portion of said telescoping body portion has reinforced members therein positioned above said hydraulic cylinder rods which are attached thereto.

7. A telescoping camper body in accordance with claim 6, in which said reinforced members are reinforced steel channels mounted to the roof portion of said telescoping body portion of said camper body.

* * * * *